(12) United States Patent
Larsson et al.

(10) Patent No.: US 7,620,622 B1
(45) Date of Patent: Nov. 17, 2009

(54) METHOD AND SYSTEM FOR INDEXING INFORMATION AND PROVIDING RESULTS FOR A SEARCH INCLUDING OBJECTS HAVING PREDETERMINED ATTRIBUTES

(75) Inventors: Daniel Mattias Larsson, Maidenhead (GB); Jan Olof Gelin, Blackwater (GB); Ian Douglas Hegerty, Maidenhead (GB)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 09/802,114

(22) Filed: Mar. 8, 2001

(51) Int. Cl.
*G06F 17/30* (2006.01)
(52) U.S. Cl. ........................................ 707/3
(58) Field of Classification Search ............. 707/2, 707/3, 6, 10, 102, 103 R, 104.1, 4, 19, 200, 707/9; 709/217, 218, 223, 224, 203; 715/501.1, 715/513
See application file for complete search history.

(56) References Cited

U.S. PATENT DOCUMENTS

| | | | | |
|---|---|---|---|---|
| 5,694,594 A | * | 12/1997 | Chang | 395/606 |
| 5,911,139 A | | 6/1999 | Jain et al. | |
| 6,178,426 B1 | * | 1/2001 | Klein et al. | 707/102 |
| 6,202,061 B1 | * | 3/2001 | Khosla et al. | 707/3 |
| 6,271,840 B1 | | 8/2001 | Finseth et al. | |
| 6,297,824 B1 | | 10/2001 | Hearst et al. | |
| 6,317,740 B1 | * | 11/2001 | Mukherjea et al. | 707/4 |
| 6,401,118 B1 | * | 6/2002 | Thomas | 707/4 |
| 6,434,556 B1 | | 8/2002 | Levin et al. | |
| 6,442,576 B1 | * | 8/2002 | Edelman et al. | 707/513 |
| 6,466,901 B1 | * | 10/2002 | Loofbourrow et al. | 704/9 |
| 6,505,191 B1 | * | 1/2003 | Baclawski | 707/3 |
| 6,643,641 B1 | * | 11/2003 | Snyder | 707/4 |
| 2002/0078043 A1 | * | 6/2002 | Pass et al. | 707/6 |

* cited by examiner

*Primary Examiner*—Etienne P LeRoux
(74) *Attorney, Agent, or Firm*—Seth H. Ostrow; Ostrow Kaufman & Frankl LLP

(57) ABSTRACT

A system and method for providing at least one search result responsive to a search query with search query terms, includes parsing pages for a plurality of text and non-text indexable elements. The invention further includes assigning a location identifier to one or more of the plurality of elements that corresponds to a location of a given element in a given page from the set of pages and is a pointer to the location of the given element. The invention further includes storing the elements and the corresponding location identifier for the elements in a computer readable medium as records, receiving the search query to request a stored record, from a user across a networked connection, searching the plurality of records to determine elements that correspond to the search query. The invention further includes transmitting a text element and a non-text element, to the user across the networked connection.

14 Claims, 5 Drawing Sheets

2. Letter to the Congressman Gilman from former President Bill Clinton
Embassy of the United States Dublin, Ireland. Letter to Congressman Gilman from former President Clinton January 16, 2001, THE WHITE HOUSE......
http://www.usembassy.ie/pol_econ/clinton_gilman.html
Last modified: 14 Feb 2001 - 6.2k
- English
⇨ 📷 Save to MySearch^AV    ⇨ 📧 Email to a friend

3. ByteLibera - Europa
Tony Blair Avvia La Revisione Della Legge Elettorale... Per Salvare La Faccia. Tentare il tutto por tutto per rimediare allo scandolo del......
http://www.treadstone.ie/bytelibera/byte_agenzia/v01_1997_bl/06_dec_bl/v01n54_bl/02_europa.html
Last modified: 29 Jun 2000 - 5.4 k
- Italian
⇨ 📷 Save to MySearch^AV    ⇨ 📧 Email to a friend    🔊 Translate    - More Pages From This Site

4. News & Press
Fireworks Splice HTML...
http://www.imsmaxims.com/hc2000.htm
Last modified: 9 May 2000 - 9.0 k
- English
⇨ 📷 Save to MySearch^AV    ⇨ 📧 Email to a friend    - All the images from this page (2)

*FIG. 4B*

METHOD AND SYSTEM FOR INDEXING INFORMATION AND PROVIDING RESULTS FOR A SEARCH INCLUDING OBJECTS HAVING PREDETERMINED ATTRIBUTES

BACKGROUND OF THE INVENTION

1. Field of the Invention

The invention relates generally to data retrieval systems, and more specifically to a method and system for indexing information, searching information and providing search results responsive to a query.

2. Description of the Related Art

The Internet has become one of the greatest information resources the world has ever known. Web sites throughout the world include a rich collection of text, images, audio, and video. However, finding specifically sought information among these web pages is not an easy task. Several search engines have been created to assist users in seeking information of interest. Most search engines feature searches of the text portion of web pages. These search engines typically include an index of web pages retrieved by its automated browsers (called robots or spiders). Thus, when a search engine receives a generated query including one or more keywords, the search engine locates pages that include at least one of the keywords and serves the user web pages that list the pages that include the one or more keywords received. The search results usually include a title and some information scraped from the web page. The user then selects the web pages to be displayed by clicking on the corresponding hyperlink. In many cases, many search results are servers and selection is not easy because the descriptive text shown in the search may not convey the full content of the corresponding page. There are also multimedia search services which locate documents containing or linking to multimedia files such as images in response to text search queries. Examples of such search services include the AltaVista image search and the Lycos multimedia search for pictures. However, such services search only for documents containing images. Moreover those searches search only specialized image indexes. Therefore, there is a need for a search system wherein search results provide the user a better indication of the content of the web pages identified responsive to a received query.

SUMMARY OF THE INVENTION

Briefly according to one embodiment of the invention, a system and method for providing at least one search result responsive to receiving a search query comprising at least one search query term, includes receiving the search query; locating at least one record containing at least one search query term; displaying a text representation of each of the records containing at least one search query term; and displaying a representation of an object in relation with the text representation for each record that includes an object comprising at least one predetermined attribute.

According to another embodiment of the invention, a method for indexing records in an index of an information network, comprises the acts of: receiving a record; searching the record for an indication that an object comprising at least one specified attribute is to be displayed with the record; finding the indication; creating a representation of the object; storing the representation in association with the record to which it corresponds; and making an entry for the record in the index, said entry indicating the object to be displayed with the record.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
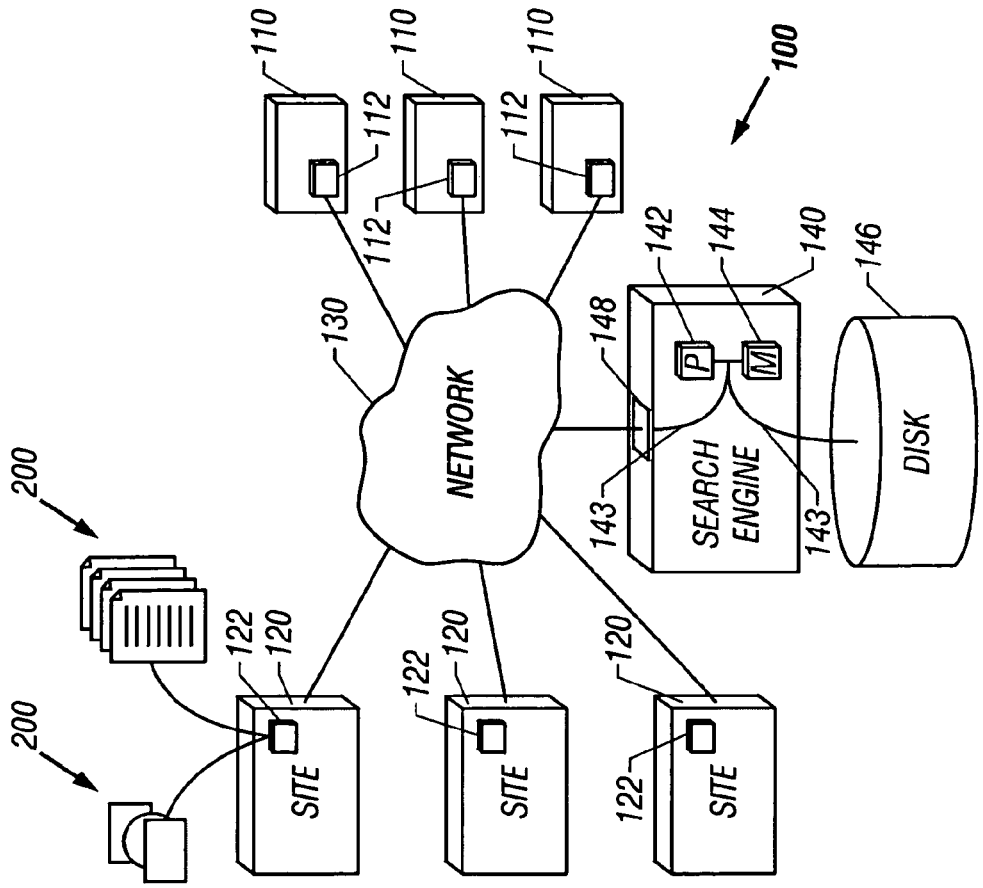
FIG. 1 is a block diagram illustrating a distributed computer system for indexing a plurality of distributed information records according to an embodiment of the invention.

FIG. 1 shows a distributed computer system 100 including a plurality of distributed information records 200 to be indexed. The distributed system 100 includes client computers 110 connected to server computers (sites) 120 via a network 130. The network 130 can use Internet communications protocols (IP) to allow the clients 110 to communicate with the servers 120.

The client computers 110 can be personal computers, workstations, or larger or smaller computer systems. Each client computer 110 typically includes one or more processors, memories, and input/output devices. The servers 120 can be similarly configured. However, in many instances server sites 120 include many computers, perhaps connected by a separate private network. In fact, the network 130 may include hundreds of thousands of individual networks of computers. Although the client computers 110 are shown as being separate from the server computers 120, it should be understood that a single computer can perform both client and server roles.

During operation of the distributed system 100, users of the clients 110 desire to access information records 122 stored by the servers. The records of information 122 can be in the form of Web (or HTML) pages 200 or other data formats such as FTP (file transfer protocol). The pages 200 can contain or link to data records including as content plain textual information, or more complex digitally encoded multimedia content, such as software programs, images, graphics, audio signals, videos, and so forth.

It should be understood that although this description focuses on locating information on the World Wide Web (the web), the system can also be used for locating and indexing information via other wide or local area networks (WANs and LANs), or information stored in a single computer using other communications protocols.

The client computers 110 can execute Web browser programs 112, such as NAVIGATOR, EXPLORER or MOSAIC (all trademarks of their respective owners) to download and display the pages or records 200. The browser programs 112 allow the users to enter addresses of specific Web pages 200 to be retrieved. Typically, the address of a Web page is specified as a Universal Resource Locator (URL). In addition, once a page has been retrieved, the browser programs 112 can provide access to other pages or records responsive to a user "clicking" on hyperlinks in previously retrieved Web pages.

Such hyperlinks provide an automated way to enter the URL of another page, and to retrieve that page.

The search engine 140 assists users to identify pages of interest among the millions of pages which are available on the Web. The search engine 140 parses the pages 200, indexes the parsed pages, searches the index 70, and presents users with information about the pages 200 located.

The search engine 140 can be configured as one or more clusters of symmetric multi-processors (P) 142, for example, Compaq Computer Corporation ALPHA processors, memories (M) 144, disk storage devices 146, and network interfaces 148 are connected to each other by high speed communications buses 143. Although, the ALPHA processors 142 are 64 bit RISC processors, the search engine 140 can be any type of processor, which has sufficient processing power and memories, including 32 bit CISC processors. For smaller collections of information, the search engine can be run on the computer storing the database.

Search Engine Overview

Figure 2:
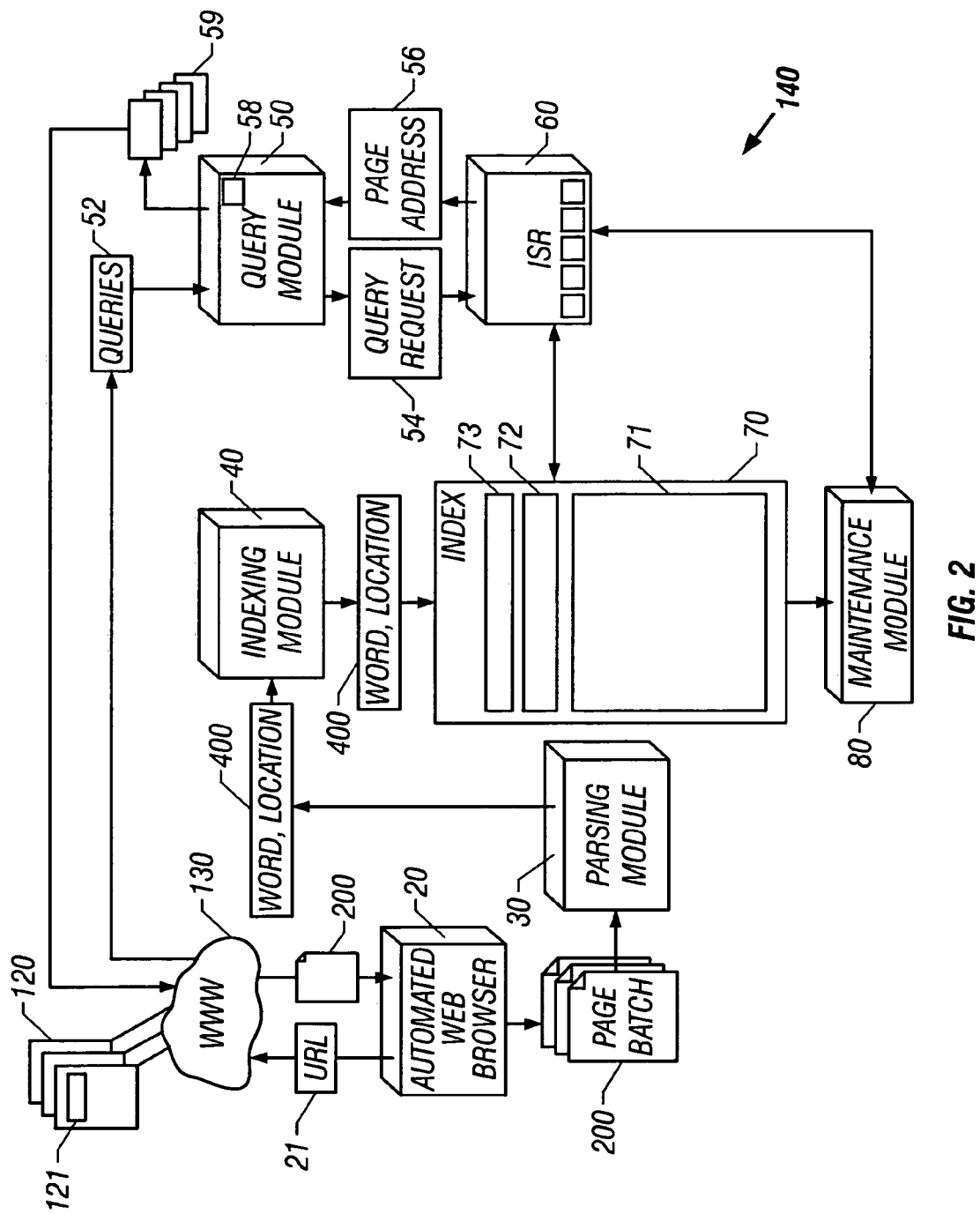
FIG. 2 is a block diagram of a search engine including an index.

FIG. 2 shows the basic components of the search engine 140. The search engine 140 can include an automated Web browser or spider 20, a parsing module 30, an indexing module 40, a query module 50, index stream readers (ISR) 60, an index 70, and a maintenance module 80.

Browsing

During the operation of the search engine 140, the spider 20 periodically sends out service requests 21 over the network 130. The requests 21 include URLs. In response to the requests 21, the sites 120 return the records or pages 200 to the spider 20. The spider 20 can locate additional pages by following hyperlinks embedded in previously acquired pages. The browser 20 is described more completely in U.S. Pat. No. 5,974,455 entitled "System and Method for Locating Pages on the World Wide Web" and which is hereby incorporated by reference.

Parsing

The pages 200 can be presented to the parsing module 30 as they are received or in batches which may amount to ten thousand pages or more, at one time. The parsing module 30 breaks down the portions of information of the pages 200 into fundamental indexable elements or atomic pairs 400. The word is a literal representation of the parsed portion of information, the location is a numeric value. The pages are parsed in order of the location of the words such that a location of the first word of a next page follows a location of the last word of a previous page. The parsing module 30 assigns increasing integer numbers to the locations, although other sequential orderings are also possible.

Indexing

The indexing module 40 sorts the pairs 400, first in word order, and second in location order. The sorted pairs 400 are used to generate the index 70 of the words of the pages 200. Abstractly, the index 70 can be pictured as comprising compressed data structures 71 and summary data structures 72-73. The compressed data structure 71 is a compression of the word location pairs 400. The data structure 72 is a summary of the structure 71 and the data structure 73 is a summary of data structure 72. The structures 71 and 72 can be stored on disk, and the structure 73 can be stored in DRAM (dynamic random-access memory).

In the data structure 71, each word representing a unique portion of information of the pages 200 is stored only once. All of the locations which are instances of the word in the pages 200 are stored following the word. The locations follow the word in an order according to their locations. The locations essentially are pointers to the parsed portions of information.

The data structures of the index 70 are optimized for query access. This means that the word-location pairs 400 are compressed to reduce storage, and uncompressing is minimized in order to preserve processor cycles during searching. Furthermore, the data structures of the index 70 also allow concurrent maintenance of the index 70 to delete old entries and to add new entries while queries are processed.

Querying

Users interact with the index 70 via the query module 50 by providing queries 52. Users can be located remotely or locally with respect to the search engine 140. The terms of a query can include words and phrases, e.g., multiple words enclosed in quotation marks ("). The terms can be related by Boolean operators such as OR, AND, and NOT to form expressions.

During operation, the query module 50 analyzes the queries 52 to generate query requests 54. The query requests invoke a small number of basic types of object-oriented index stream readers (ISRs) 60. The index stream readers 60 sequentially scan the data structures 71-73 in a manner to minimize the amount of data that need to be uncompressed.

As a result of searching the index 70 by the stream reader objects 60, addresses 56 of pages which are qualified by the queries are identified. A presentation module 58 delivers information 59 about the qualifying pages to the users. The information 59 can include a summary of the pages located. Using the summary information, the users can access the identified pages with Web browsing software, or other techniques. The information 59 is preferably provided in the form of Web pages including a list of sites satisfying the received query. Each search result preferably includes a list of sites satisfying the received query. Each search result preferably includes a hyperlink to the subject site.

Maintaining

The maintenance module 80 is used to add and delete information of the index 70. Modified pages can be handled as a delete and add operation. A particular problem solved is to allow substantially continuous access to the index 70 by millions of users each day as the index 70 is concurrently updated. The maintenance module 80 also effectively deals with duplicate Web pages containing substantially identical content.

Indexing and Serving Images and Other Objects

According to one embodiment of the invention, the spider 20 searches for indications (e.g., links) that images 121 (or other non-markup objects such as audio files) having predetermined attributes or characteristics such as a high quality image (determined by size, aspect ratio, and number of colors) are to be displayed with the subject Web page. Once found the qualifying image is extracted, converted to a thumbnail (reduced resolution) version and indexed along with the parent page identifier (URL). Alternatively, the image may be stored in full-resolution form an converted to a thumbnail for serving to users as part of the search results. The indexing may be done simply by including an entry in the index 70 (e.g., a unique identifier) that indicates that the subject page includes a link to an image comprising the predetermined attributes. The qualifying images are stored to be transmitted for display to end-users. The images may be stored within the system 140 or may be stored in any other server connected to the web 130 for serving to end-users therefrom.

The Parsing Module

Words

Figure 3:
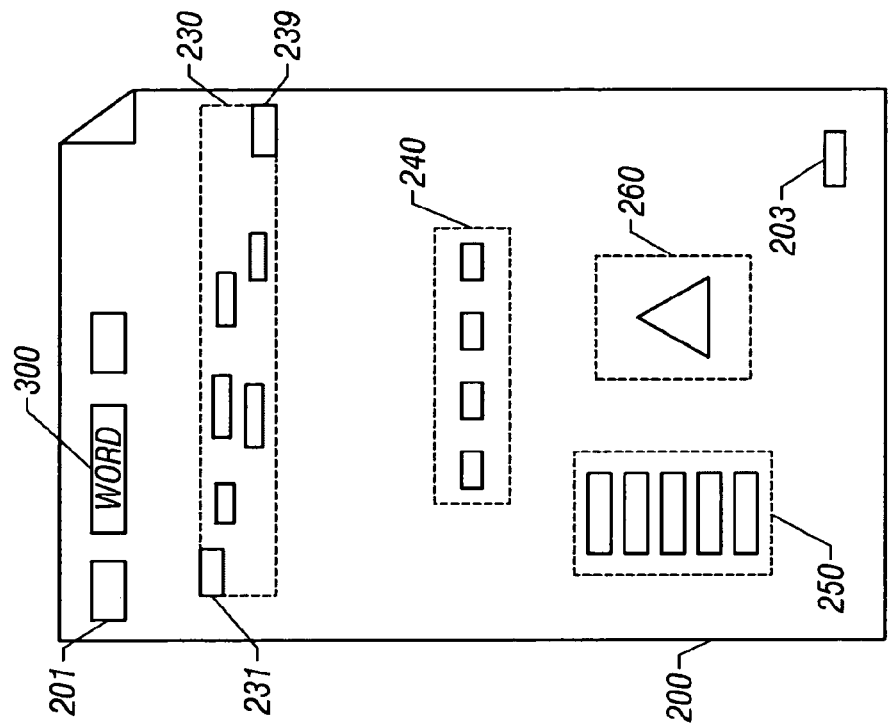
FIG. 3 is a block diagram of pages parsed by the search engine of FIG. 2.

As shown in FIG. 3, the records or pages 200 are parsed by the parsing module 30 in the order that pages are received from the browser 20. The parsing module 30, in a collating order of the sequential locations of the content, breaks the information of the pages 200 down into discrete indexable elements or individual "words" 300. In the index 70 each word is stored as a "literal" or character based value. It should be understood, that the terms "page" 200 and "word" 300 are used to represent many different possible content modalities and data record specifications. According to an embodiment, the parser finds any indication within the subject page than an image is to be displayed therewith.

Pages

A page 200 can be defined as a data record including a collection of portions of information or "words" having a common database address, e.g., a URL. This means that a page can effectively be a data record of any size, from a single word, to many words, e.g., a large document, a data file, a book, a program, or a sequence of images.

On the Web, it has become common to represent information using a hypertext Markup Language (html). In this case, the pages can include other "marks" which indicate how the "words" of the page are to be processed and presented. Pages can include programs, for example JAVA applets, which may require specialized parsing. The information of some pages can be expressed in a programming language, for example, Postscript (.ps), or Acrobat (.pdf) files. The pages 200 can encode multimedia items including digitized images, graphic, audio or video components.

The pages or data records 200 are not necessarily Web pages. For example, the pages can be composed of portions of information of other databases, for example, all of the case law in the United States. Even if such pages do contain hyperlinks, they may contain other types of links. In this context, the links mean references in one document which can be used to find other documents. Although hyperlinks are one example, many other types of links may be processed.

Word and Location Pairs

Each page 200 is broken down into a sequence of pairs 400 according to the collating order of the locations of the words 300. Each pair 400 stores a word and its location. The locations of the words indicate the relative order in which the parsing module identified the words 300 in the pages 200.

Attributes and Metawords

In addition to recognizing locations and words, the parsing module 30 also detects and encodes attributes about the content of the records or pages. Attributes can be associated with entire pages, portions of pages 230, 240, 250, and 260, e.g., fields, or individual words 203. Attribute values, as defined herein, are expressed as "metawords." Metawords are also stored as literals, this means that the search engine 140 treats metawords the same as words. Therefore, a metaword is associated with a location to form a pair metaword, location. Thus, according to an embodiment of the invention, for pages wherein an image or other object is located, a metaword can be indexed indicating the presence of the image or object in the document.

For example, the page 200 of FIG. 3 can have several associated attributes. Portion 230 has an attribute associated with it that indicates the nature of the text in that portion. Portion 240 can be selections from various audio files. Portion 250 includes an attribute indicating selections of video files and portion 260 includes an attribute indicating an image.

Serving Blended Search Results

Figure 4A:
FIG. 4 is a search result page according to an aspect of the invention.

Referring to FIG. 4, there is shown a search results page served in response to the query "Tony Blair." These results are "blended" in that some results include only text abstracts and others include both the abstract and a thumbnail image associated therewith. Results 1, 2, and 3 only include a title, a short excerpt from the text of the subject page, the page URL, the date last modified, the language of the page, and user options (e.g., to save to a "my search" file or to email the page to a friend). That is because those results do not include images including predetermined attributes. In addition to the above items result 4 shows an image to which the subject page includes a link. The image is shown such that the end user can associate the image with the relevant result. In this case the image is shown alongside the text representation of the content of the subject page but the image may be shown underneath the text representation or elsewhere in the result page as long as some indication is made of the search result to which it relates.

The image shown is preferably the first image appearing in the page that meet the predetermined criteria (e.g., it comprises certain attributes or characteristics). However, it is also possible to display the image most relevant to the query by scanning annotations or other text in the subject page relating to the image.

In one embodiment, only the first image appearing in a crawled page is retrieved, stored, and indexed. However, it is also possible to retrieve and store every image found in every page, and index therewith certain metawords relevant to the query may be served.

Figure 5:
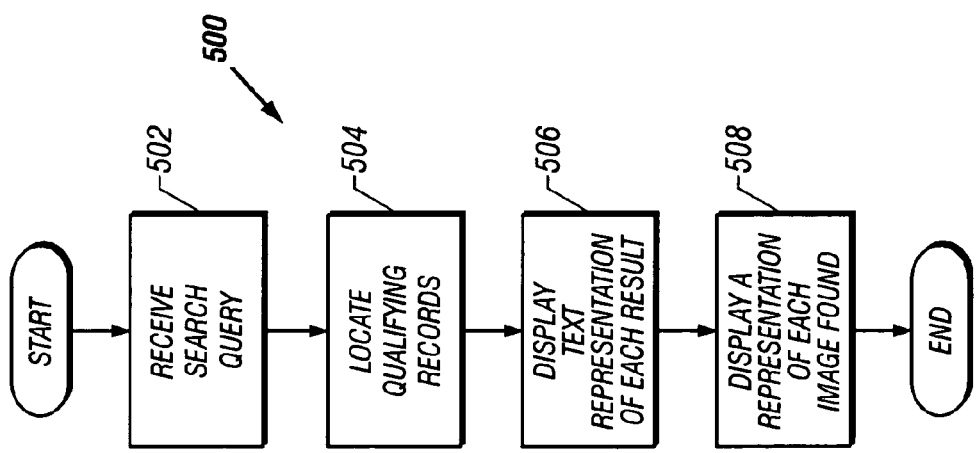
FIG. 5 is a flow chart illustrating a method according to an aspect of the invention.

Referring to FIG. 5, there is illustrated a method 500 for providing at least one search result responsive to receiving a search query including at least one search term (or keyword). The method 500 includes the acts of: receiving the search query (502); locating at least one qualifying record (e.g., a Web page) containing at least one search query term (504); transmitting a text representation (e.g., an abstract) of each of the qualifying records for display to a user (506); and transmitting a representation of an object (e.g., a thumbnail image) in relation with the text representation of each qualifying record that includes an object comprising at least one predetermined attribute for display to the user (508). Search results that do not include images are presented as text-only descriptions of the pages to which they relate.

In the preferred embodiment, each thumbnail image is displayed next to the text representation of the record to which it corresponds. In other embodiments, the search engine can index references to other objects such as programs, audio files, video files or other multimedia files and store representations of such objects for serving to users as a part of search results.

Method for Indexing Images to be Displayed

Figure 6:
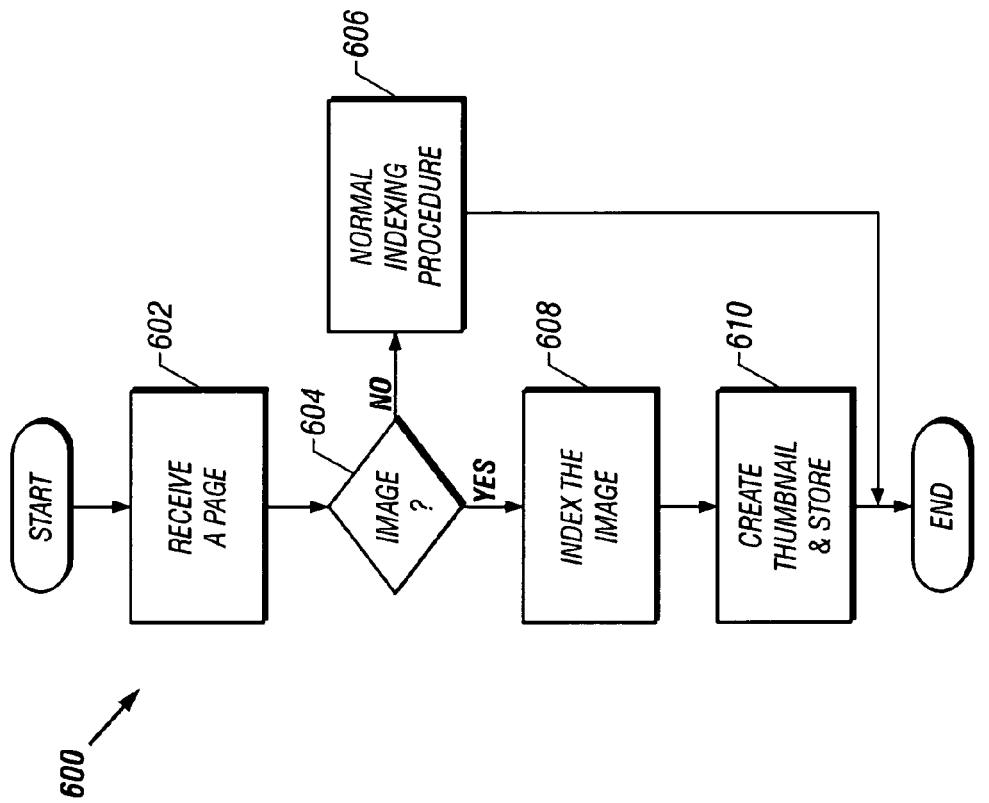
FIG. 6 is a flow chart illustrating a method according to another aspect of the invention.

Referring to FIG. 6, there is illustrated a method 600 for indexing records in an index of an information network. The method 600 comprises the acts of: receiving a page or other record (602); determining whether the page includes a link to an image, or other object, comprising at least one specified attribute such as a predetermined size (604); determination 604 is affirmative, the image is indexed (608) by making an entry in the search engine index that indicates the presence of the link to the image in the subject page; and a representation of the image such as a thumbnail (a reduced resolution version) is created and stored (610) for serving to users. Thus, according to this embodiment of the invention the spider 20 is modified to mine the retrieved documents for images to be indexed so that they can be served with search results to which they pertain.

In the preferred embodiment images having predetermined attributes are indexed and stored to be served with search results. However, as in the case of the search procedure 500, other objects may be located within Web pages crawled and those objects can be indexed and stored for serving to end users.

What is claimed is:

1. A method for providing at least one search result responsive to a search query comprising at least one search query term, the method comprising:
    parsing a set of pages for a plurality of text and non-text indexable elements;
    assigning a location identifier to one or more of the plurality of text and non-text indexable elements, the location identifier corresponding to a location of a given text and non-text indexable element in a given page from the set of pages and the location identifier is a pointer to the location of the given text and non-text indexable element;
    storing the plurality of text and non-text indexable elements and the corresponding location identifier for the one or more of the plurality of text and non-text indexable elements in a computer readable medium as a plurality of records;
    receiving the search query to request a stored record, the search query received from a user across a networked connection;
    searching said plurality of records to determine text and non-text indexable elements that correspond to the search query;
    transmitting at least one text element representation of said query result to the user across the networked connection; and
    transmitting at least one non-text element representation of said query result to said user across the networked connection.

2. The method of claim 1, wherein the non-text elements comprises an image.

3. The method of claim 1, wherein the record comprises a Webpage.

4. The method of claim 1, wherein the non-text indexable element comprises a sound file.

5. A method for indexing records in an index of the world wide web, the method comprising:
    receiving a record from the world wide web;
    parsing the record for associated text and a non-text indexable elements;
    creating representations of the parsed text and non-text indexable elements;
    assigning a location identifier to one or more of the representations of the parsed text and non-text indexable elements, the location identifier corresponding to a location of a given text and non-text indexable element in the record and the location identifier is a pointer to the location of the given text and non-text indexable element; and
    storing the representations and the corresponding location identifiers in association with the record as a one or more word location pairs.

6. The method of claim 5, wherein the non-text indexable element comprises an image.

7. The method of claim 5, wherein the record comprises a Web page.

8. A system for providing at least one search result responsive to a search query comprising at least one search query term, the system comprising:
    a parse module for parsing the at least one record for text and non-text indexable elements and assigning a location identifier to one or more of the plurality of text and non-text indexable elements, the location identifier corresponding to a location of a given text and non-text indexable element in the at least one record;
    an indexing module for indexing the text and non-text indexable elements and the corresponding location identifier for the one or more of the plurality of text and non-text indexable elements, the location identifier is a pointer to the location of the given text and non-text indexable element;
    a query module for receiving the search query, the search query requesting at least one text and non-text indexable element in the world wide web, the search query received from a user across a networked connection;
    a search module for locating corresponding text and non-text indexable element relating to the search query; and
    a transmitter for transmitting a representation of the non-text indexable element and a text representation corresponding to the search query result to the user across the networked connection.

9. The system of claim 8, wherein the object comprises an image.

10. The system of claim 8, wherein the record comprises a Web page.

11. The system of claim 8, wherein the object comprises a hyperlink to a sound file.

12. A system for indexing records in an index of an information network, comprising:
    a parser for parsing a record for text and non-text indexable elements;
    a database for storing said text and non-text indexable elements;
    an query module for searching the database for a link to said non-text indexable elements appearing in the record;
    a subsystem for creating a representation of the text and non-text indexable elements and assigning a location identifier to the representation of the text and non-text indexable elements, the location identifier corresponding to a location of a given text and non-text indexable element in the record and the location identifier is a pointer to the location of the given text and non-text indexable element;
    a subsystem for storing the representation and the corresponding location identifier in association with the record; and
    a subsystem for making an entry for the record in the index including the representation and the corresponding location identifier.

13. The system of claim 12, wherein the object comprises an image.

14. The system of claim 12, wherein the record comprises a Web page.

* * * * *